(12) United States Patent
Studebaker, Jr. et al.

(10) Patent No.: US 10,327,416 B1
(45) Date of Patent: Jun. 25, 2019

(54) CROWDING TUB APPARATUS, SYSTEM AND METHOD

(71) Applicant: Robert L. Studebaker, Jr., Tulsa, OK (US)

(72) Inventors: Robert L. Studebaker, Jr., Tulsa, OK (US); Derick Leroy Slater, Okmuglee, OK (US)

(73) Assignee: Robert L. Studebaker Jr., Tulsa, OK (US)

( * ) Notice: Subject to any disclaimer, the term of this patent is extended or adjusted under 35 U.S.C. 154(b) by 264 days.

(21) Appl. No.: 15/299,334

(22) Filed: Oct. 20, 2016

Related U.S. Application Data

(60) Provisional application No. 62/244,581, filed on Oct. 21, 2015.

(51) Int. Cl.
*A01K 3/00* (2006.01)
*A01K 1/00* (2006.01)

(52) U.S. Cl.
CPC .................... *A01K 1/0029* (2013.01)

(58) Field of Classification Search
CPC ....... A01K 1/0029; A01K 1/0011; A01K 3/00
USPC ......................... 119/510, 522–524
See application file for complete search history.

(56) References Cited

U.S. PATENT DOCUMENTS

| | | | | |
|---|---|---|---|---|
| 2,279,840 A | * | 4/1942 | Robinson | A61D 3/00 119/510 |
| 3,931,796 A | * | 1/1976 | Hoffman | A01K 1/0613 119/801 |
| 4,829,936 A | * | 5/1989 | Mollhagen | A01K 1/0613 119/512 |
| 4,917,048 A | * | 4/1990 | Beattie | A01K 1/0613 119/502 |
| 4,960,074 A | * | 10/1990 | Wilson | A01K 3/00 119/512 |
| RE33,959 E | * | 6/1992 | Mollhagen | A01K 1/0613 119/512 |
| 5,237,960 A | * | 8/1993 | Wilson | A01K 3/00 119/514 |
| 7,174,853 B1 | * | 2/2007 | Donaldson | A01K 1/0029 119/512 |

(Continued)

FOREIGN PATENT DOCUMENTS

| | | | | |
|---|---|---|---|---|
| CA | 2996662 A1 | * | 11/2016 | ........... A01K 1/0029 |
| FR | 2221072 A1 | * | 10/1974 | ........... A01K 1/0029 |
| FR | 2889412 A1 | * | 2/2007 | ........... A01K 1/0613 |

*Primary Examiner* — Peter M Poon
*Assistant Examiner* — Danielle A Clerkley
(74) *Attorney, Agent, or Firm* — Frederic Dorwart, Lawyers PLLC; Penina Michlin Chiu

(57) ABSTRACT

A crowding tub apparatus, system and method is described. A crowding tub includes three gates pivotably coupled to a rounded frame, wherein each of the three gates pivot in linked sequence towards an animal exit. A crowding tub includes a first gate coupled to a center post of the frame and rotatable between a first radial side and a second radial side of the frame, the second radial side having an animal exit, wherein the animal exit extends between a door post and a gate post, a second gate rotatably coupled to the second radial side between the gate post and the center post, and a third gate rotatably coupled to the gate post, wherein the three gates are coupled in linked sequence such that rotating the first gate towards the second radial side rotates the second and third gates to obstruct the animal exit.

17 Claims, 10 Drawing Sheets

(56) References Cited

U.S. PATENT DOCUMENTS

| | | | |
|---|---|---|---|
| 7,628,436 B1 * | 12/2009 | Cutler | B60P 3/04 |
| | | | 119/412 |
| 2006/0112904 A1 * | 6/2006 | Davis Mollhagen | |
| | | | A01K 1/0029 |
| | | | 119/843 |
| 2010/0300362 A1 * | 12/2010 | Danneker | A01J 5/0175 |
| | | | 119/14.02 |

* cited by examiner

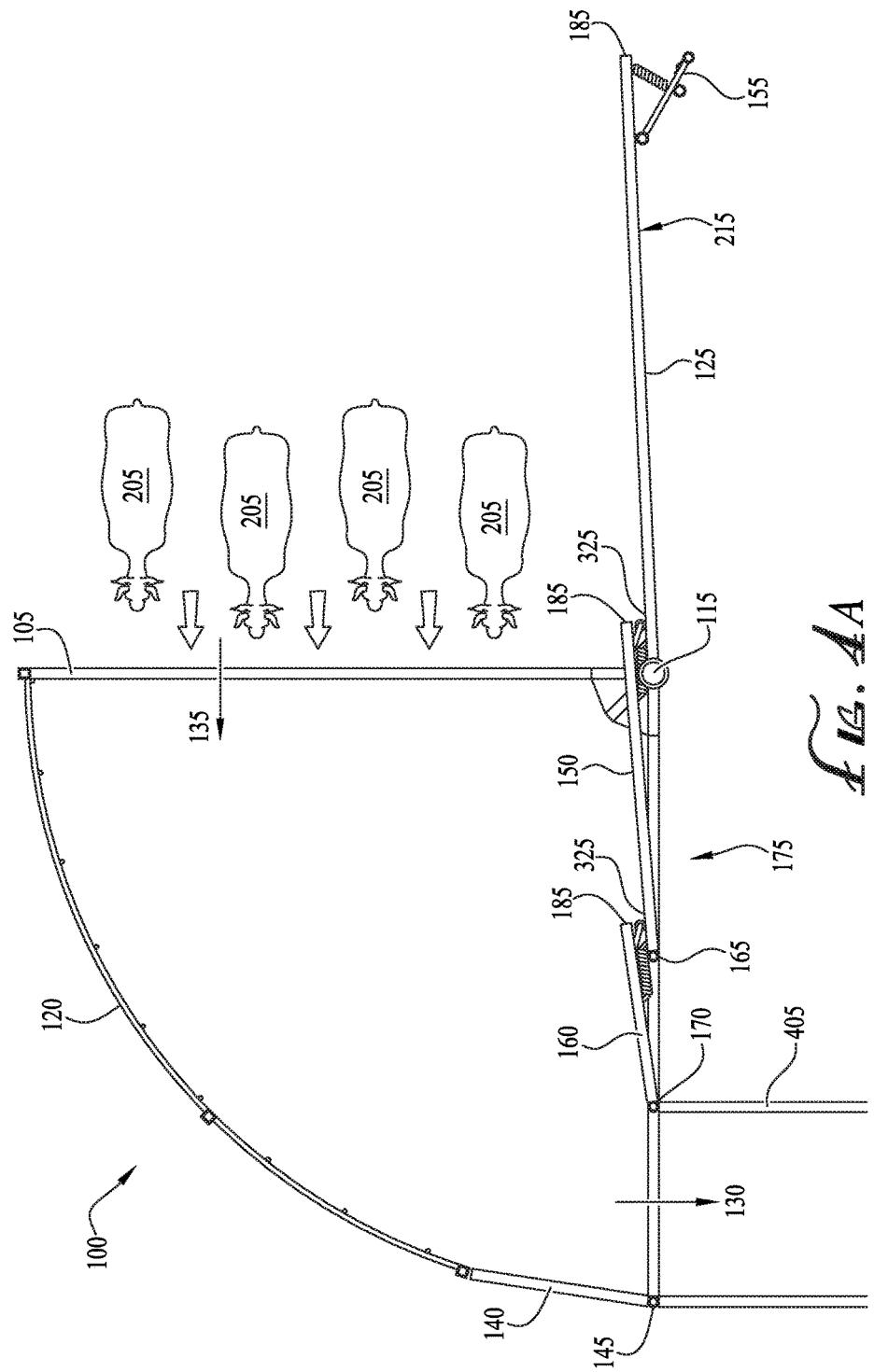

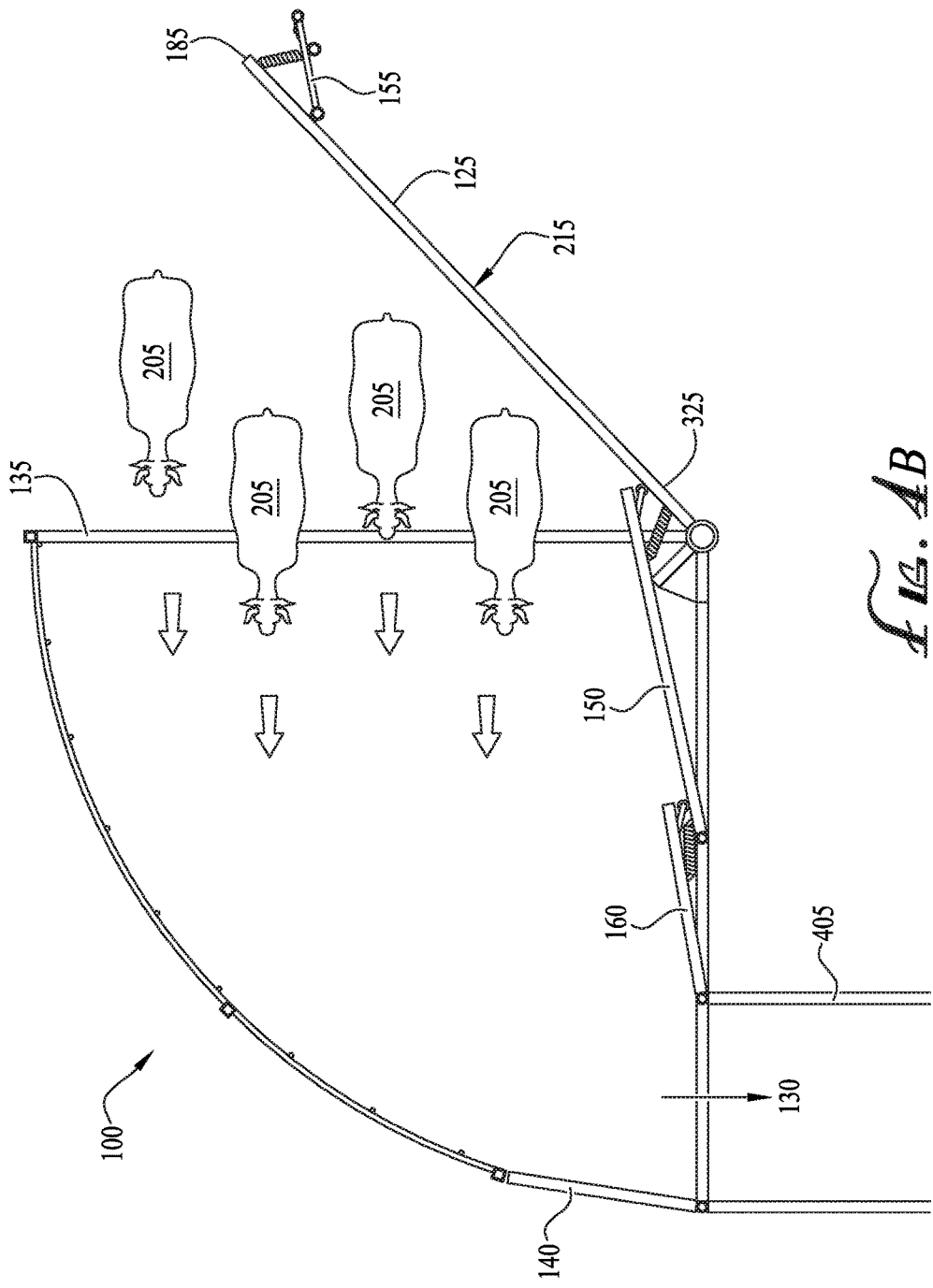

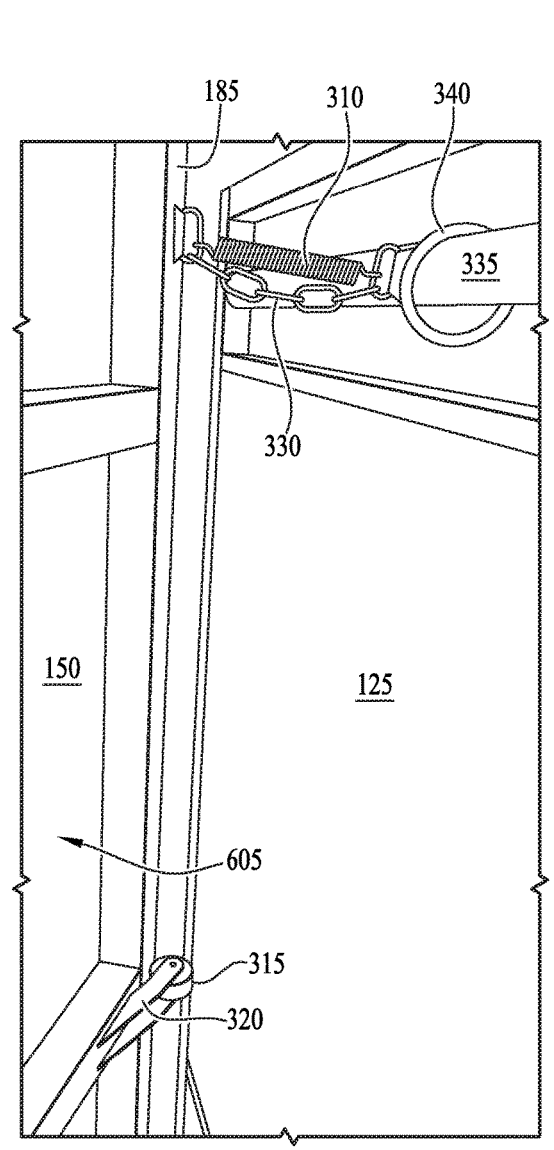
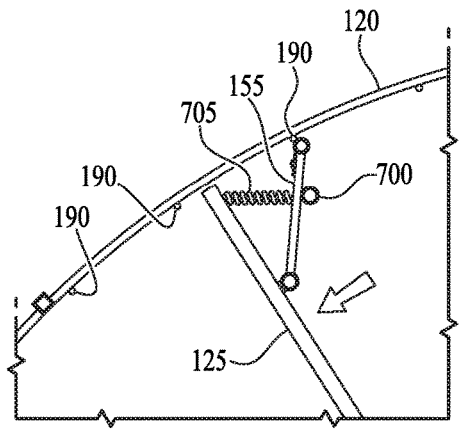
FIG. 7A
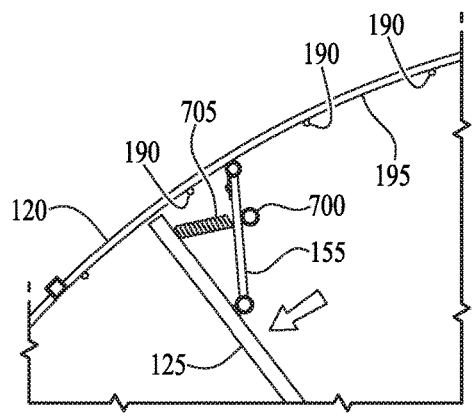
FIG. 7B
FIG. 6
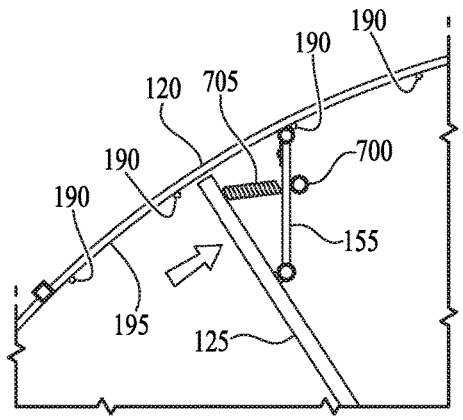
FIG. 7C

CROWDING TUB APPARATUS, SYSTEM AND METHOD

CROSS REFERENCE TO RELATED APPLICATIONS

This application claims the benefit of U.S. Provisional Application No. 62/244,581 to Studebaker et al., filed Oct. 21, 2015 and entitled "CROWDING TUB APPARATUS AND SYSTEM," which is hereby incorporated by reference in its entirety.

BACKGROUND OF THE INVENTION

1. Field of the Invention

Embodiments of the invention described herein pertain to the field of livestock working equipment. More particularly, but not by way of limitation, one or more embodiments of the invention enable a crowding tub apparatus, system and method.

2. Description of the Related Art

Livestock producers often need to handle their livestock in order to perform medical treatment, health or other maintenance such as vaccinations, artificial insemination, pregnancy testing or animal sorting. Many livestock species such as cattle and sheep, form herds, and therefore must be maneuvered into a single file formation to isolate individual animals for the handling procedures.

Crowding tubs, also sometimes called crowding pens, are typically used to reduce livestock to a single file or to sort the animals. A conventional crowding tub includes a steel frame that forms a portion of a circle. One side of the frame has a wide animal entrance, and the opposite side, has a narrower animal exit. A large gate sweeps in a circular motion around the inside of the frame behind the animals, forcing the animals in a single file through the narrow exit. In some conventional designs, a second gate closes around the animals about halfway around the frame in an attempt to guide the animals to the exit and away from the walls of the frame.

However, current two-gate crowding tubs suffer from the disadvantage that the conventional gates do not completely clear livestock from the tub. The conventional second gate pivots on the side of the frame where the conventional animal exit is located, about halfway between the large gate pivot and the exit. The wall and gate together form a "corner." Livestock inside the tub become stuck in the corner, rather than moving towards the exit. To remove the corner, the pivot of the second gate is sometimes shifted closer to the exit, rather than midway along the frame wall. This removes the corner, but causes the end of second gate to bump up against the frame too early in its rotation, which prevents the second gate from closing all the way. The length of the conventional second gate cannot be shortened without creating new corners where animals become stuck. If the second gate does not close, then one or two animals may remain inside the tub rather than passing through the exit, since the gates are not closing behind them. These remaining animals and animals stuck in corners may need prodding to leave the tub.

A typical livestock producer handles hundreds or thousands of animals per day, with groups of ten or fifteen animals handled in a tub at a time. It may take five or ten minutes to prod an animal with its nose stuck in a corner to leave the tub. A few hours a day may therefore be lost prodding animals stuck in the crowding tub, which is an inefficient use of time and man-hours.

In addition, conventional crowding tubs are typically arranged to move animals in either a clockwise or counter-clockwise direction, depending on the direction an animal producer needs in his facility. If the direction of the crowding tub needs to be changed, the entire crowding tub must be unbolted, taken apart, and then re-bolted so the tub is arranged in the new direction. This is a labor intensive and time consuming process.

As is apparent from the above, current crowding tubs suffer from many shortcomings. Therefore, there is a need for an improved crowding tub apparatus, system and method.

BRIEF SUMMARY OF THE INVENTION

One or more embodiments of the invention enable a crowding tub apparatus, system and method.

A crowding tub apparatus, system and method is described. An illustrative embodiment of a crowding tub includes a frame forming a sector of a circle, the frame including two radial sides coupled together by a center post and an arc portion, a first gate rotatably coupled to the center post, wherein the first gate extends between the center post and the arc portion, and wherein the first gate rotates around the center post between the first radial side and the second radial side of the frame, the second radial side having an opening defining an animal exit, wherein the animal exit extends between a door post adjacent the arc portion and a gate post on the second radial side, a second gate rotatably coupled to the second radial side between the gate post and the center post, and a third gate rotatably coupled to the gate post, wherein the first gate, second gate and third gate are coupled in linked sequence such that rotating the first gate around the center post towards the second radial side rotates the second and third gates into a closed position obstructing the animal exit. In some embodiments, the first gate is about the length of the first radial side, the second gate is about half the length of the first gate, and the third gate is about half the length of the second gate. In certain embodiments, the second gate is rotatably coupled to the second radial side at about a midpoint of the second radial side. In some embodiments, the first, second and third gates rotate closed in a counter-clockwise direction, and the direction of rotation reverses by rollably inverting the frame. In certain embodiments, the second gate is slideably coupled to the first gate and the third gate is slideably coupled to the second gate by a ringed chain, a roller, a spring or a combination thereof. In some embodiments, rotating the gates towards the second radial side guides animals inside the frame out the animal exit in a single file line. In certain embodiments, the sector is one of a half circle, about a half circle, a quarter circle or about a quarter circle. In some embodiments, the animal exit is moveable from the second radial side to the arc portion. In certain embodiments, the first gate includes an extendable latch on a front side of the first gate, an inside of the arc portion includes a set of latch stops spaced at intervals, and when in an extended position the latch engages with a particular latch stop of the set of latch stops to prevent reverse motion of the first gate.

An illustrative embodiment of a crowding tub system includes a rounded frame forming a portion of a circle and three gates pivotably coupled to the rounded frame, wherein the three gates pivot in linked sequence towards an animal exit. In some embodiments, the three gates include a first gate, a second gate and a third gate, and where in the first gate is about twice the length of the second gate and the second gate is about twice the length of the third gate. In some embodiments, the first gate is coupled to a first post at a center point of the rounded frame, the second gate is coupled to a second post on an exit side of the rounded frame, and the third gate is coupled to a third post on the exit side of the rounded frame, wherein the second post is between the first post and the third post. In certain embodiments, the second post is positioned at a midpoint of the exit side of the rounded frame. In some embodiments, the three gates include a first gate, a second gate and a third gate, and wherein the second gate is rollably coupled to the first gate and the third gate is rollably coupled to the second gate. In certain embodiments, the three gates include a first gate, a second gate and a third gate, and the system further includes a means for sliding the second gate along the first gate and a means for sliding the third gate along the second gate.

An illustrative embodiment of a method of funneling animals into a single file using a crowding tub includes arranging a horizontally symmetric crowding tub in a livestock handling system by rolling the crowding tub in one of a bottom-up or top-up orientation, the crowding tub including a series of three pivotable gates coupled in linked succession, opening a first gate of the series of three gates outside a crowding tub frame to allow livestock to enter the crowding tub frame, pivoting the first gate of the series of three gates inside the frame and then towards an animal exit such that the second gate and third gate successively pivot towards the animal exit, and guiding the livestock in a single file through the animal exit using the series of three pivoting gates. In some embodiments the method further includes one of rolling, sliding or a combination thereof the second gate along the first gate and one of rolling, sliding or a combination thereof the third gate along the second gate as the first gate pivots towards the animal exit. In certain embodiments, the livestock is cattle and the series of three gates eliminates corners inside the crowding tub where cattle become stuck. In some embodiments, the method further includes extending a latch while pivoting the first gate, wherein the latch cooperates with stops on an inside of the crowding tub frame to prevent pivoting of the first gate away from the animal exit while livestock are inside the crowding tub.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which:

FIGS. 4A-4E are top plan views of a crowding tub of an illustrative embodiment and illustrating motion of the crowding tub as the gates are pivoted and livestock moves through the crowding tub.

FIG. 6 is a perspective view of an illustrative embodiment of a coupling between adjacent gates.

FIGS. 7A-7C are top plan views of a self-catching latch of an illustrative embodiment.

Figure 1:
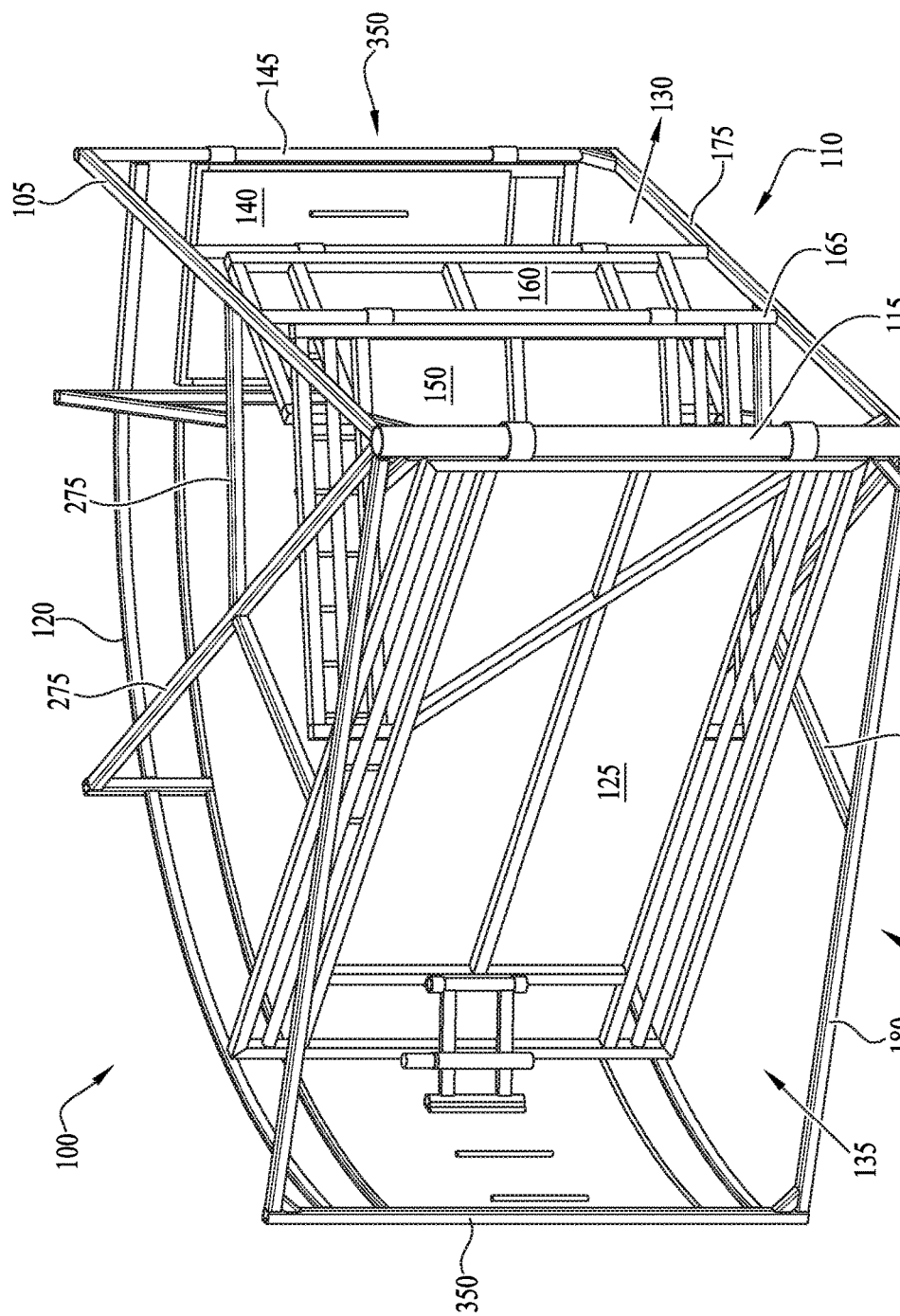
FIG. 1 is a perspective view of a crowding tub of an illustrative embodiment.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A crowding tub apparatus, system and method will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a pivot includes one or more pivots.

"Coupled" refers to either a direct connection or an indirect connection (e.g., at least one intervening connection) between one or more objects or components. The phrase "directly attached" means a direct connection between objects or components.

"Inward," with respect to a sector-shaped crowding tub, means the direction towards the center post of the crowding tub and/or away from the arc portion. "Outward" means the direction away from the center post of the crowding tub and/or towards the arc portion.

As used in this specification and the appended claims, "about" when used to describe a length in inches, means within 6.0 inches of the stated value. When used to describe an angle in degrees, "about" means within 10°.

One or more embodiments provide a crowding tub apparatus, system and method. While illustrative embodiments are primarily described in terms of a cattle handling embodiment, nothing herein is intended to limit the invention to that embodiment. Illustrative embodiments may be equally applicable to sheep, horses, bison or other livestock. While illustrative embodiments are described herein as a three-gate embodiment, nothing herein is intended to limit the invention to three gates. Depending on the shape of the crowding tub and the size of the animals being funneled to single file, additional gates may be added in the fashion described herein to further eliminate corners of sufficient size where an animal may become stuck and/or turn to face the wrong direction (away from the exit). For example, a fourth gate may be coupled in linked sequence between the second and third gate or between the first and second gate, in the manner described herein.

Illustrative embodiments provide an animal crowding tub that funnels a group of livestock into a single file line. Illustrative embodiments may eliminate corners and/or other spaces in a crowding tub where animals may become stuck inside the crowding tub. The crowding tub of illustrative embodiments may be shaped as a sector of a circle. A first rotating gate, about radial in length, may hinge, rotate and/or pivot around a central post of the sector. As the first gate rotates it may push second and third pivotable gates closed in linked sequence. The second gate may pivot around a radial side of the sector that includes an animal exit, with a pivot point about midway along the length of the side. The third door may hinge around the animal exit like a door to the animal exit. As the primary gate pivots it may push or pull the second and third gates closed or open in a fan-like motion. In some embodiments, rather than the animal exit being located on a radial side of the sector, it may be located along the arc (circumference) of the sector. The gates of illustrative embodiments may eliminate problematic areas within a crowding tub where animals conventionally would become stuck. Illustrative embodiments may therefore reduce the need for prodding and reduce the man hours needed to handle and/or sort livestock.

The crowding tub of illustrative embodiments may be reversible without the need to disassemble the crowding tub frame and gates. The crowding tub of illustrative embodiments may be top-to-bottom symmetric (horizontally symmetric). To change the direction of motion and/or rotation, the crowding tub of illustrative embodiments may be inverted by rolling the crowding tub over, without the need for reassembly of the frame and gates. The crowding tub of illustrative embodiments may be welded together and ready to use when delivered, rather than being in sections that require bolting.

Figure 2:
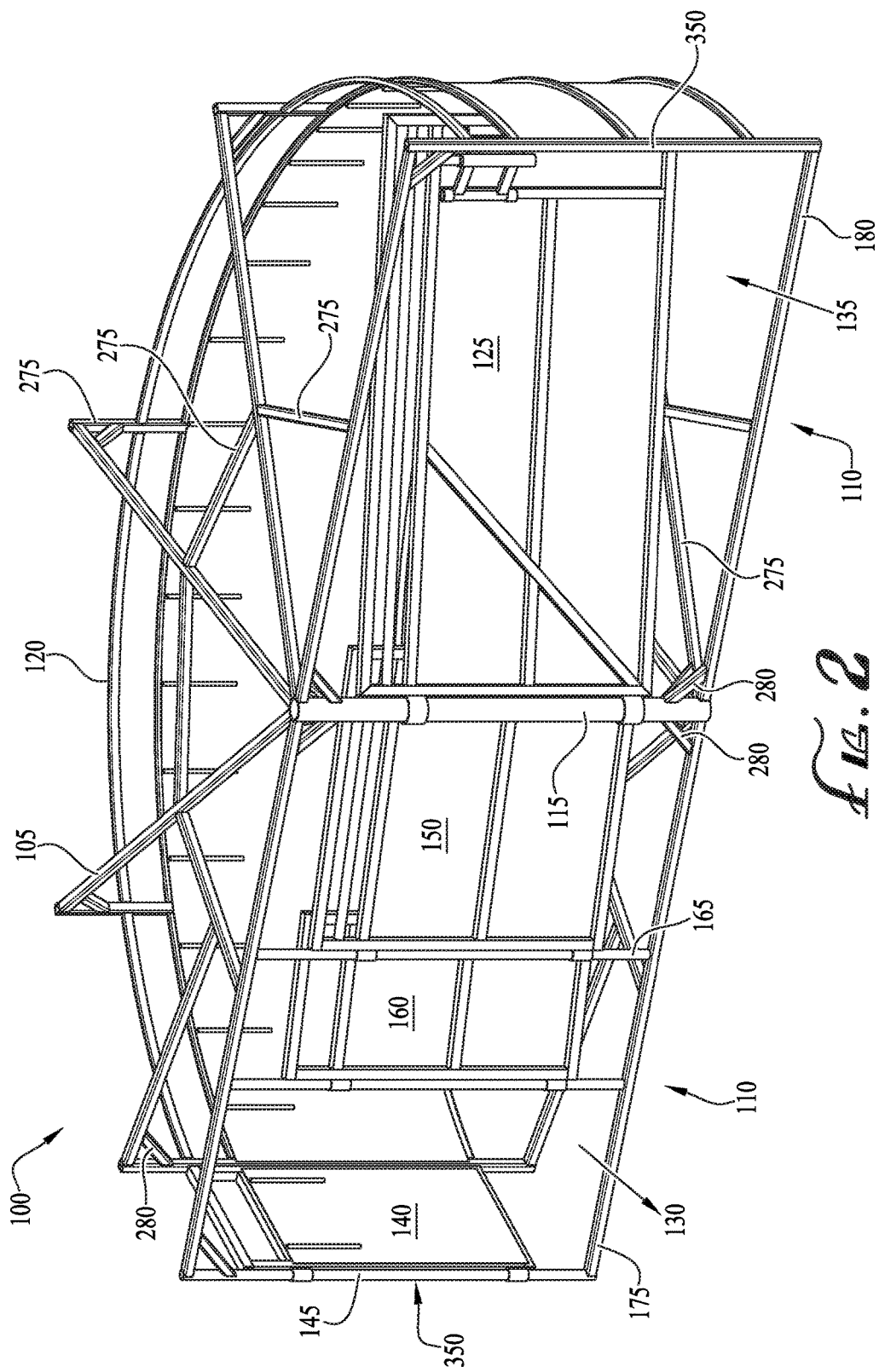
FIG. 2 is a perspective view of a crowding tub of an illustrative embodiment.

FIG. 1 and FIG. 2 illustrate a crowding tub of illustrative embodiments. Crowding tub 100 may be shaped as a quarter circle, 90°, as illustrated in FIG. 1, or may be shaped as a half circle, 180°, as illustrated in FIG. 2. Crowding tub 100 may also be other sector sizes, such as seventy degrees or one-hundred-ten degrees, depending upon the arrangement of livestock handing equipment to which crowding tub 100 connects and/or the number of animals to be sorted in a given rotation of crowding tub 100. Larger crowding tubs 100 forming greater portions of a circle may sort more animals per rotation. Crowding tub 100 may include a frame 105 that may form the shape of crowding tub 100 and be a supportive structure for crowding tub 100. Frame 105 may be made of pipe, tubing, beams and/or flats and include pivots and/or hinges as is well known to those of skill in the art to provide for gates, doors and/or any other moving, swinging, pivoting and/or hinging parts. Frame 105 and gates 125, 150, 160 may be made of carbon steel, although other similar materials may be used that withstand being outdoors and/or the weight of heavy livestock such as cattle. Joints may be lubricated in order to provide smooth and/or quiet movement. In one example, frame 105 may include ¼ inch thick carbon steel panel walls, 2 inch square tubing, and 4½ inch pivot pipe.

Frame 105 and/or crowding tub 100 may be shaped as a sector of a circle and include two radial sides 110 that are equivalent or substantially equivalent in length. Each radial side 110 may be a radius of the sector shape forming crowding tub 100. In quarter-circle embodiments as shown in FIG. 1, two radial sides 110 may be perpendicular to one another, meeting at center post 115. In semi-circle embodiments as shown in FIG. 2, two radial sides 110 may be in a straight line, like a diameter, with center post 115 between and/or at the intersection of the two radial sides 110. Each radial side 110 may meet at center post 115, which may serve as the center of the sector forming crowding tub 100. Center post 115 may be positioned at the location that is the center of the circle from which the sector of crowding tub 100 is taken. One radial side 110 of frame 105 may be entrance side 180 and include entrance 135 for animals entering crowding tub 100. The second radial side 110 may be an exit side 175 and include animal exit 130, where animals may exit crowding tub 100 in a single file. Animal exit 130 may be narrower than entrance 135, since animals may enter crowding tub 100 in an unorganized fashion, but exit in a single file. The width of exit 130 may be determined based on the width of the animals sorted in crowding tub 100. A single animal should be capable of passing through exit 130 when squarely facing exit 130, but exit 130 should not be wide enough for two animals to pass through exit 130 when next to one another.

Figure 3:
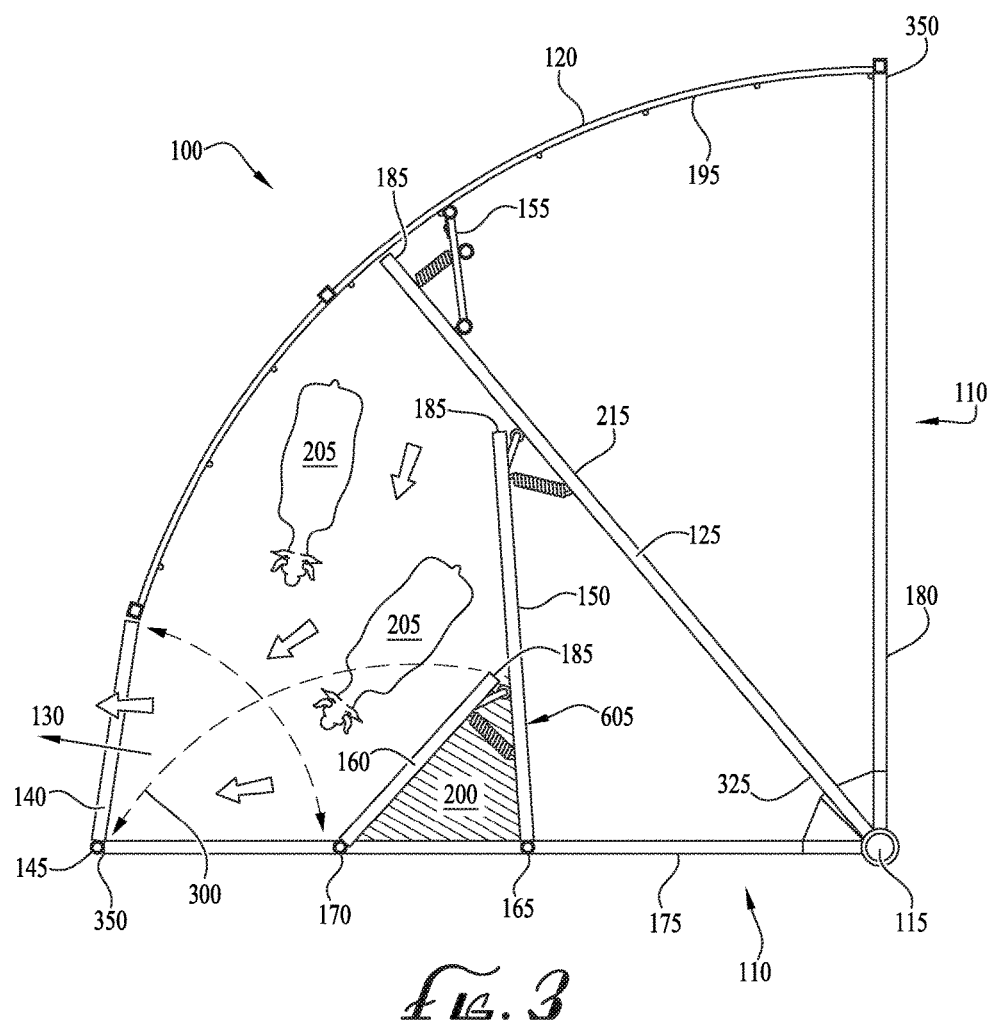
FIG. 3 is a top plan view of a crowding tub of an illustrative embodiment with livestock inside the crowding tub.

Arc portion 120 may form the circumference, circumferential portion and/or arc of the sector of crowding tub 100. Arc portion 120 may connect first and second radial sides 110 at outer end 350 of each radial side 110, the end of radial side 110 opposite central post 115. Steel panels and/or solid panels may define the wall of arc portion 120. In some embodiments, as shown in FIG. 3, animal exit 130 may be moveable to and/or located on arc portion 120 adjacent to exit side 175 of crowding tub 100. Animal exit 130 may be moveable between exit side 175 and arc portion 120 proximate to exit side 175 by swinging, hinging, rotating and/or adjusting door 140 about door post 145. Door post 145 may be at the intersection between exit side 175 and arc portion 120. Door 140 may swing about door post 145 such that one of two animal exits 130 is open, either an animal exit 130 on arc member 120 (shown in FIG. 3) or an animal exit 130 on exit side 175 (shown in FIG. 4A). Door 140 may include a panel so that animals may not pass through door 140 when closed. Door 140 may close animal exit 130 that is not currently in use. A moveable exit may be useful in sorting animals and/or providing additional equipment arrangement options to a livestock producer making use of illustrative embodiments.

As shown in FIG. 2, in addition to pipes, bars, tubes, flats and/or panels forming a sector shape, frame 105 may include support members 275, which may be bars, pipes, beams, flats and/or tubes extending across the top and/or bottom of frame 105 to provide support to frame 105 structure during operation and/or inversion. Frame 105 may also include frame supports 280, which may provide additional stability to posts such as central post 115, support members 275 and/or frame 105, for example frame supports 280 may form a tripod around central post 115 at the top and bottom of central post 115, as shown in FIG. 2 and/or frame supports 280 may brace support member 275 proximate arc portion 120 at the intersection of two connecting support members 275.

Returning to FIG. 3, crowding tub 100 may include at least three gates. First gate 125 may be the gate that initiates motion of crowding tub 100. First gate 125 may be about the length of radial side 110, and slightly shorter in length than the radius of frame 105 such that outer edge 185 of first gate 125 may rotate along, around and/or proximate interior 195

(inner diameter) of arc portion 120. First gate 125 may include solid panels such that animals may not pass through first gate 125. The length of first gate 125 should be determined such that as first gate 125 sweeps around interior 195 of crowding tub 100, outer edge 185 of first gate 125 is slightly shy of interior 195 of arc portion 120, for example within a half inch, one inch or two inches of interior 195 of arc portion 120. Latch 155 may be attached to exterior 215 of first gate 125 so that first gate 125 may be manually pushed or pulled by a livestock handler to open or close crowding tub 100.

FIGS. 7A-7C illustrate an exemplary embodiment of latch 155. Latch 155 may include handle 700 to allow an operator to push and/or pull first gate 125. Latch 155 may be extendable and/or compressible with latch spring 705 and serve as a self-catching latch when first gate 125 is being closed and latch 155 and/or handle 700 is being used to push first gate 125 towards animal exit 130. A plurality of stops 190 may be spaced around interior 195 of arc portion 120 at a height level with latch 155. Latch 155 may prevent first gate 125 from moving backwards in the instance that animals undesirably move towards animal entrance 135 when the operator intends the animals to move towards exit 130. As shown in FIGS. 7A-7B, when first gate 125 is being pushed towards animal exit 130, latch spring 705 may extend to allow latch 155 to pass stops 190. As shown in FIG. 7C, should an animal inside crowding tub 100 undesirably back-up and attempt to push primary gate 125 away from animal exit 130, latch spring 705 may compress causing latch 155 to catch on a particular stop 190. In this way, livestock inside crowding tub 100 may be prevented from moving backwards.

Turning to FIG. 4A, first gate 125 may hinge, swing, rotate and/or pivot about central post 115. As shown in FIG. 4A, first gate 125 may swing open outside of arc portion 120 to allow animals 205 to initially enter crowding tub 100. As shown in FIG. 4A, entire entrance side 175 may form animal entrance 135. As first gate 125 begins to close, it may sweep behind entering animals 205 to animal entrance 135 and inside frame 105, around arc portion 120, and towards exit side 175. When closed, first gate 125 may entirely or substantially block exit side 175 by extending from central post 115 to door 140 and/or proximate door post 145.

Second gate 150 may include panels and be hinged to, rotate and/or pivot about support post 165. Second gate support post 165 may be a vertical pipe, tube, bar and/or beam that extends vertically on exit side 175 of crowding tub 100, rotatably supporting second gate 150. Support post 165 of second gate 150 may be about midway along the length of exit side 175, and second gate 150 may be about half the length of first gate 125. Outer edge 185 of second gate 150 may extend towards door 140 and/or proximate door post 145 when closed, towards central member 115 when open, and towards arc member 120 and/or first gate 125 when partially open.

Second gate 150 may be moveably attached to first gate 125. FIG. 6 illustrates an exemplary moveable attachment of second gate 150 to first gate 125. Second gate 150 may be slideably and/or springily attached at or near its outer edge 185 to first gate 125. First gate 125 may include a horizontally extending pipe 335 proximate the top of first gate 125. Chain 330 may connect and/or be fixed to outer edge 185 of second gate 150 on one end, and may include ring 340 that surrounds pipe 335 on a second end of chain 330. As first gate 125 pivots towards exit side 175, ring 340 may slide along pipe 335 such that outer edge 185 of second gate 150 moves outwards along first gate 125 and/or pipe 335. Gate spring 310 may hold outer edge 185 of second gate 150 close to first gate 125, such as within a few inches. Gate spring 310 may hold second gate 150 tightly to first gate 125 as first gate pivots towards animal exit 130. Spring 310 may for example be a spring one-inch in diameter and six-inches long to hold gates 125, 150 together as they move in linked sequence and/or linked succession, such that when first gate 125 is opened towards entrance 135, second gate 150 follows, tracking the motion of first gate 125 closely.

As the gates 125, 150 close, outer edge 185 of second gate 150 may slide lengthwise along first gate 125 starting proximate inner edge 325 (shown in FIG. 3) of first gate 125, proximate central post 115, moving towards outer edge 185 of first gate 125 as the gates pivot towards animal exit 130. As shown in FIG. 3, when the gates are open or partially open, outer edge 185 of second gate 150 may intersect with first gate 125 in a triangular fashion such that as first gate 125 closes towards exit side 175, second gate 150 is also pushed closed in the same direction, sliding lengthwise along first gate 125 and sweeping in a smaller circle or portion thereof. Returning to FIG. 6, one or more rollers 315 may be attached to second gate 150 to assist outer edge 185 of second gate 150 in sliding along first gate 125 as the gates 125, 150 pivot. Rollers 315 may be placed on front 605 and/or vertically in the middle of second gate 150. Placing rollers 315 in the middle of second gate 150 may preserve horizontal symmetry should crowding tub 100 be inverted. In an exemplary embodiment, roller 315 may be made from nylon, be about three inches in diameter, about 1.5 inches thick and include bracket 320 that attaches rollers 315 to second gate 150.

Third gate 160 may include panels and be hinged, rotatable about and/or pivoted to gate post 170. Gate post 170 may be a vertical pipe, tube, bar and/or beam that extends vertically and forms the inward side of animal exit 130 when animal exit 130 is located on exit side 175. Gate post 170 may be located about a quarter of the distance from door post 145 to center post 115. Third gate 160 may be about the size of door 140. When animal exit 130 is on exit side 175 and third gate 160 is closed, third gate 160 may close all the way and/or block animal exit 130 such that livestock may not pass through animal exit 130. Third gate 160 may be about half the length of second gate 150 and/or a quarter of the length of first gate 125.

Third gate 160 may be coupled to second gate 150 in a fashion similar to the moveable attachment between second gate 150 and first gate 125, as shown in FIG. 6. Third gate 160 may be moveably chained and/or springily attached proximate its outer edge 185 to second gate 150, for example with spring 310, chain 330 and/or ring 340 such that when second gate 150 is opened towards entrance 135, third gate 160 follows. When gates 150, 160 are open or partially open, outer edge 185 of third gate 160 may intersect with second gate 150 in a triangular fashion, for example as shown in FIG. 3. As second gate 150 closes towards exit side 175, third gate 160 may also be pushed closed in the same direction, but sweeping in a smaller circle or portion thereof. Similar to second gate 150, third gate 160 may include rollers 315 to reduce friction and assist third gate 160 in sliding lengthwise along second gate 150 as the gates pivot towards animal exit 130, for example in the fashion shown in FIG. 6.

In this manner, first gate 125, second gate 150 and third gate 160 may sweep circularly within crowding tub 100 first in succession, and then concurrently, to gradually reduce the area where livestock within crowding tub 100 may be positioned and/or push or guide animals 205 towards animal exit 130. Animal exit 130 may be sized such that only a single animal may pass through at a time. In this fashion, animals within crowding tub 100 may be funneled from an unorganized group upon entering crowding tub 100 into a single file upon exiting crowding tub 100.

FIG. 3 illustrates a top view of a crowding tub of illustrative embodiments with first gate 125 partially closed. As illustrated in FIG. 3, animals 205 within crowding tub 100 may be guided towards animal exit 130 without being stuck in corner 200. The inventors have observed that corner 200, located between gate posts, may be a particularly problematic area in which livestock have a tendency to become stuck in conventional two-gate crowding tubs. The arrangement of the gates of illustrative embodiments may block animals 205 from entering corner 200 and/or provide improved guidance to livestock, reducing the likelihood that an animal will divert from the desired single file line exiting crowding tub 100. As illustrated in FIG. 3, as third gate 160 pivots in the direction of gate arrow 300, animals 205 may be guided away from corner 200 and out animal exit 130.

Figure 4C:
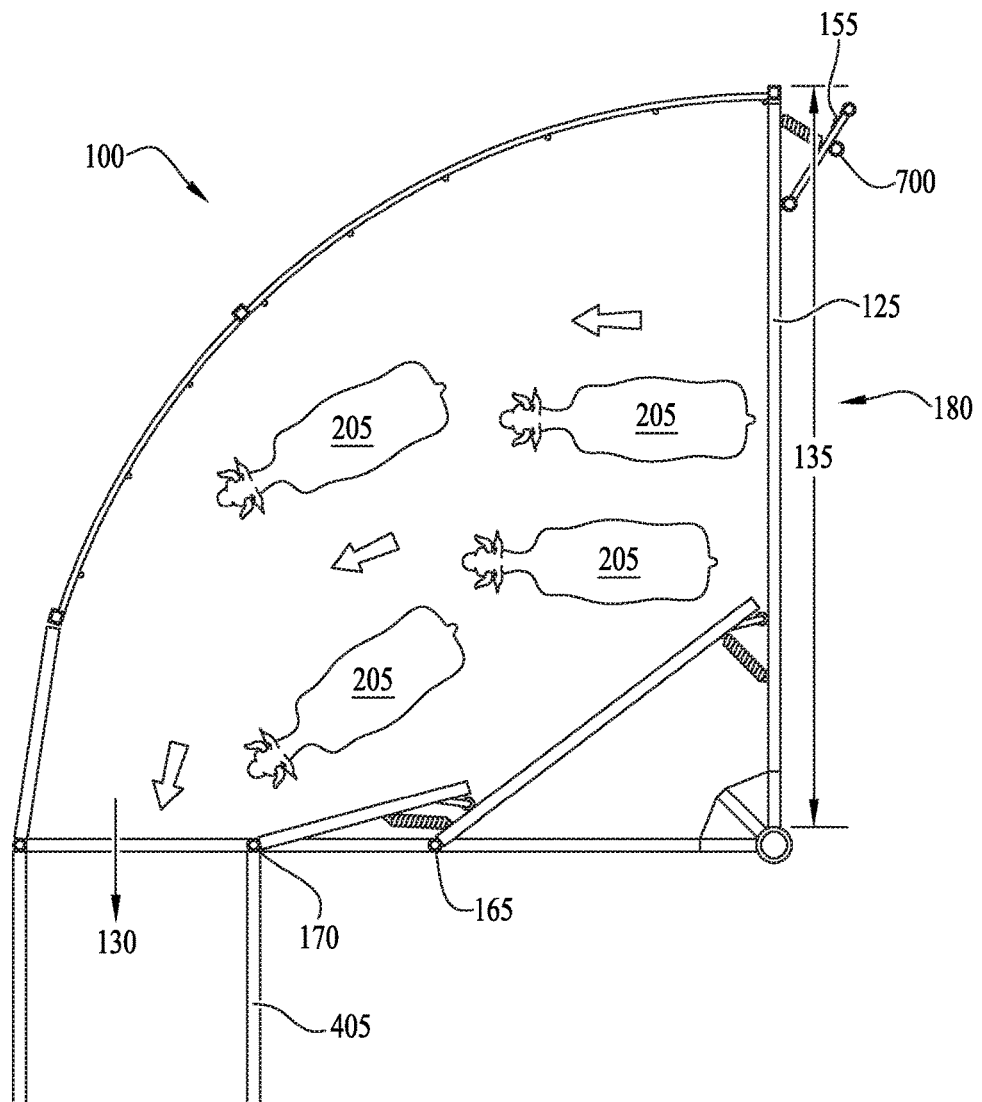

FIGS. 4A-4E illustrate the motion of gates and livestock through an illustrative embodiment of crowding tub 100. FIGS. 4A-4E show an exemplary 90° crowding tub. In FIG. 4A, first gate 125 is shown open. Second gate 150 and third gate 160 are also open and lying substantially flush with exit side 175 of frame 105. When open as shown in FIG. 4A, outer edge 185 of second gate 150 may contact first gate 125 slightly past central post 115, near inner edge 325 of first gate 125. Similarly, third gate 160 may contact second gate 150 near inner edge of 325 of second gate 150, slightly inward of support post 165. First gate 125 and second gate 150 may be connected and/or linked by spring 310, chains 330 and/or rollers 315, such that as first gate 125 is opened to the exemplary open position illustrated in FIG. 4A, second gate 150 closely follows and also opens. Similarly, spring 310, chains 330 and/or rollers 315 may connect and/or link second gate 150 to third gate 160 such that all gates open when first gate 125 is pulled or pushed open. In FIG. 4A, crowding tub 100 is shown connected and/or flowing into alley 405. As animals 205 exit animal exit 130, they may enter alley 405 in a single file. In some embodiments, alley 405 may be a squeeze chute, bud box, corral or other animal handling enclosure.

Turning to FIG. 4B, as first gate 125 begins to close, livestock are guided inside of crowding tub 100, and are isolated from animals that have been left outside crowding tub 100. The number of animals 205 that are herded into crowding tub 100 in a single rotation may depend upon the size of crowding tub 100 as well as the size of animal being herded. In FIG. 4B, second gate 150 has begun to pivot, but third gate 160 has not yet substantially moved.

In FIG. 4C, first gate 125 is shown aligned with entrance side 180 and entrance 135 is blocked by first gate 125 so that animals 205 cannot leave through entrance 135, and animals outside first gate 125 cannot enter crowding tub 100. In the position shown in FIG. 4C, third gate 160 has just begun to pivot and second gate 150 is in the course of pivoting about support post 165.

Figure 4D:
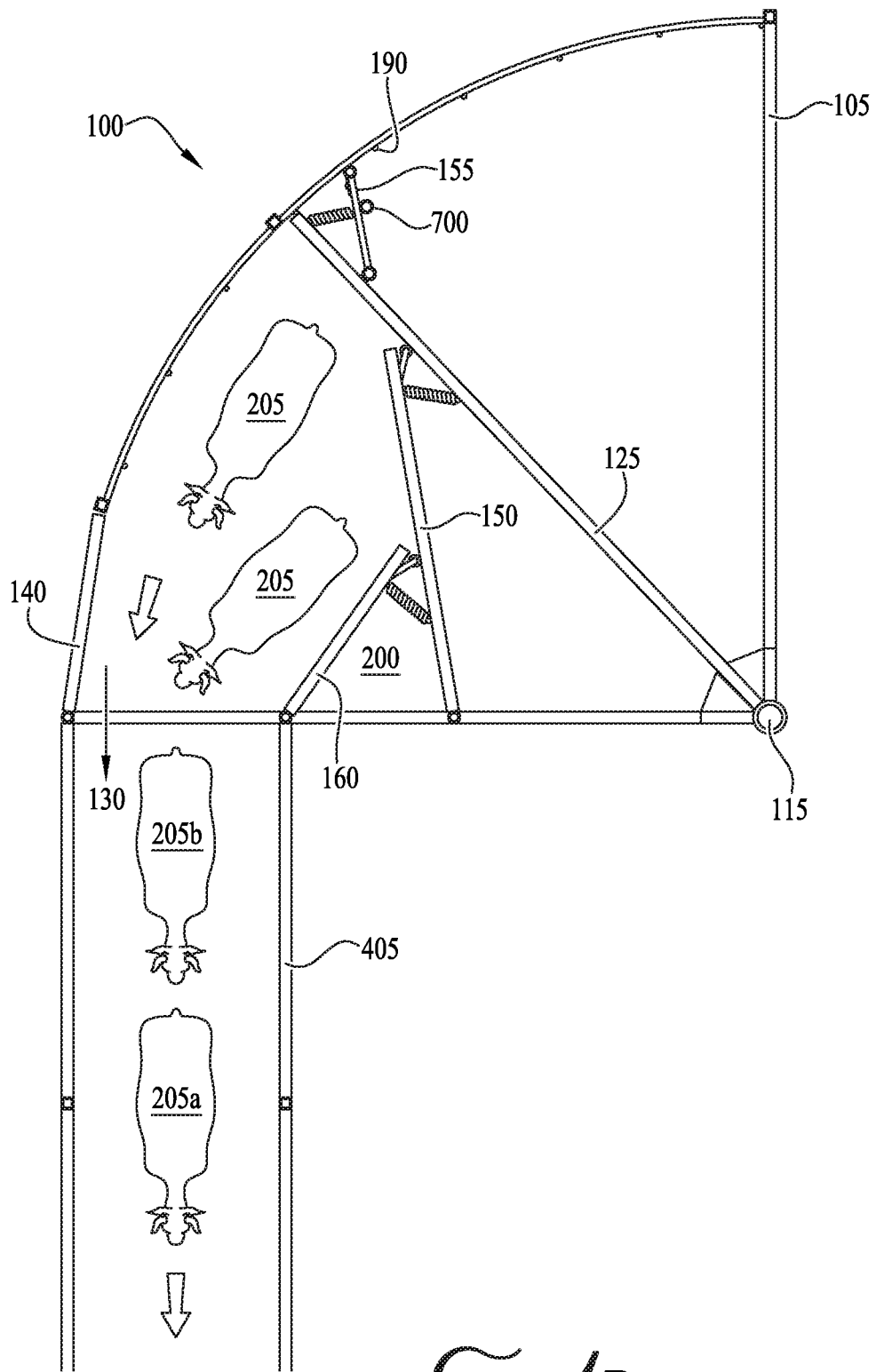

As shown in FIG. 4D, animals 205 have begun to exit through animal exit 130. Animals 205a and 205b have exited crowding tub 100 and entered alley 405 in a single file. The arrangement of pivotable first gate 125, second gate 150 and third gate 160 provide a dynamic structure in linked sequence that may efficiently guide animals 205 through exit 130 while blocking corner 200, and without creating or providing other and/or new areas where animals 205 may become stuck.

Figure 4E:
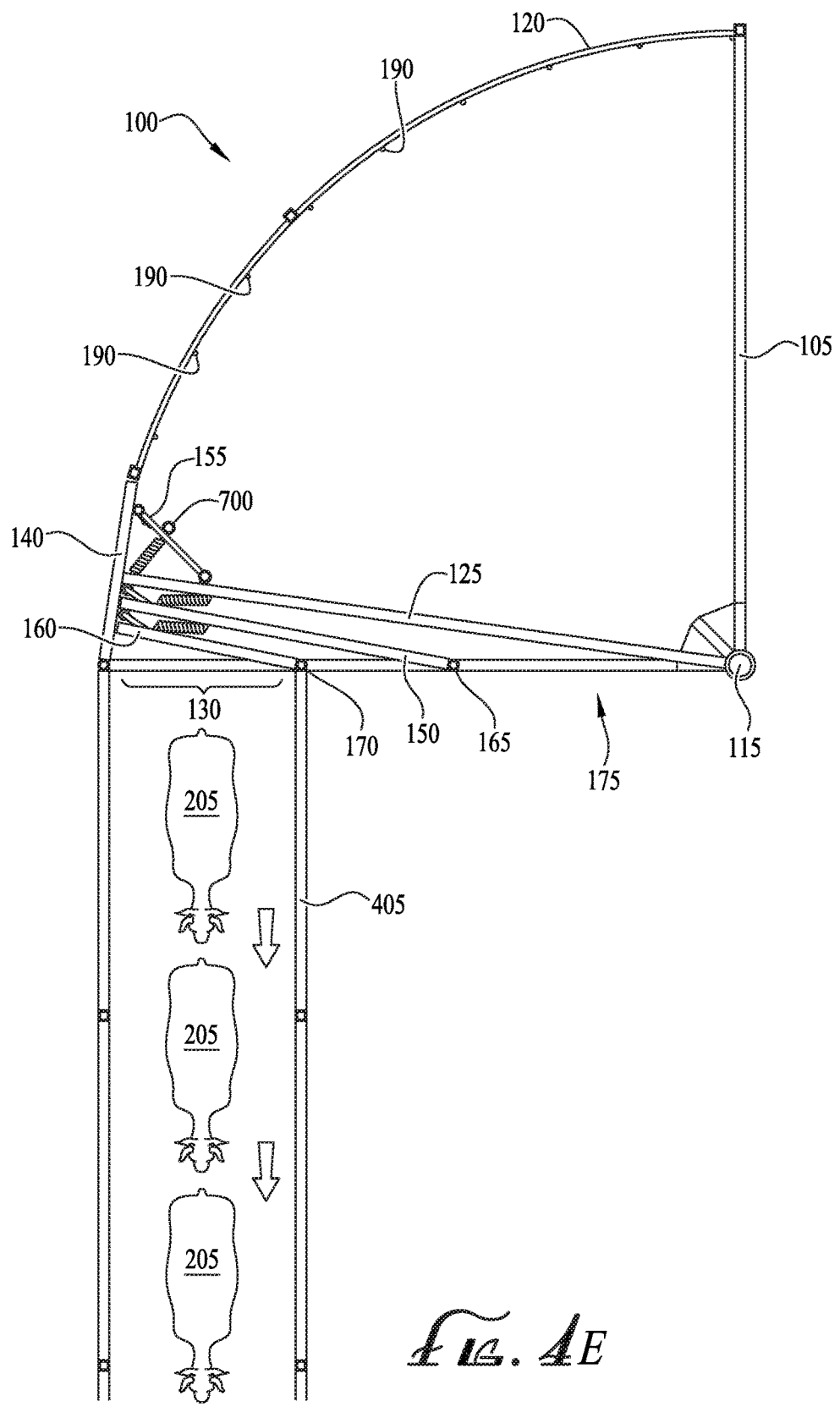

In the position of crowding tub 100 in FIG. 4E, all three gates 125, 150, 160 of illustrative embodiments are shown in a closed position, and all animals 205 that entered crowding tub 100 in the illustrative rotation of FIGS. 4A-4E have exited crowding tub 100 in a single file and entered alley 405. Animal exit 130 may, for example, lead to alley 405 or a squeeze chute or other area where animals 205 may be handled, sorted and/or where it may be desirable to have the livestock in a single file. As illustrated in FIG. 4E, when closed, first gate 125, second gate 150 and third gate 160 all may close across animal exit 130, blocking off animal exit 130 from the passage of livestock. First gate, 125, second gate 150 and third gate 160 may close far enough that animals 205 cannot remain inside crowding tub 100 around exit 130 (between third gate 160 and alley 405). Although all three gates 125, 150, 160 may not be precisely flush with exit side 175, the gates may be substantially parallel to exit side 175, eliminating any space near animal exit 130 where animals 205 may become stuck inside. Each gate 125, 150, 160 may be pivotable, rotatable and/or hingeable about its respective post 115, 165, 170.

Once animals have been guided through crowding tub 100, and gates 125, 150 and 160 have been closed, a human operator may pull latch 155 and/or handle 700 and in doing so bring gates 125, 150 and 160 back into an open position, such as the open position shown in FIG. 4A. Another group of 10 or 15 animals 205, for example, may then enter crowding tub 100 and the process may be repeated. Although the example illustrated in FIGS. 4A-4E contemplates manual movement of gates, gates may also be remote controlled through a control panel and/or include hydraulic, electric and/or pneumatic actuators.

Although in the embodiment shown in FIGS. 4A-4E, door 140 is shown closed along arc portion 120, door 140 may pivot about exit support post 145 as shown in FIG. 3, such that door 140 lies across exit side 175 covering the would-be animal exit 130 in that location, and animal exit 130 is instead on arc portion 120 adjacent to door post 145. As may be appreciated by those of skill in the art, animals 205 may be equally guided to exit 130 located on arc portion 120 as to animal exit 130 on exit side 175, without becoming stuck in any corner such as corner 200. The movability of animal exit 130 may provide an operator with additional options and flexibility with regards to design of livestock working equipment systems and/or coordinating crowding tub 100 with alley 405, squeeze chute and/or other handling equipment.

Figure 5A:
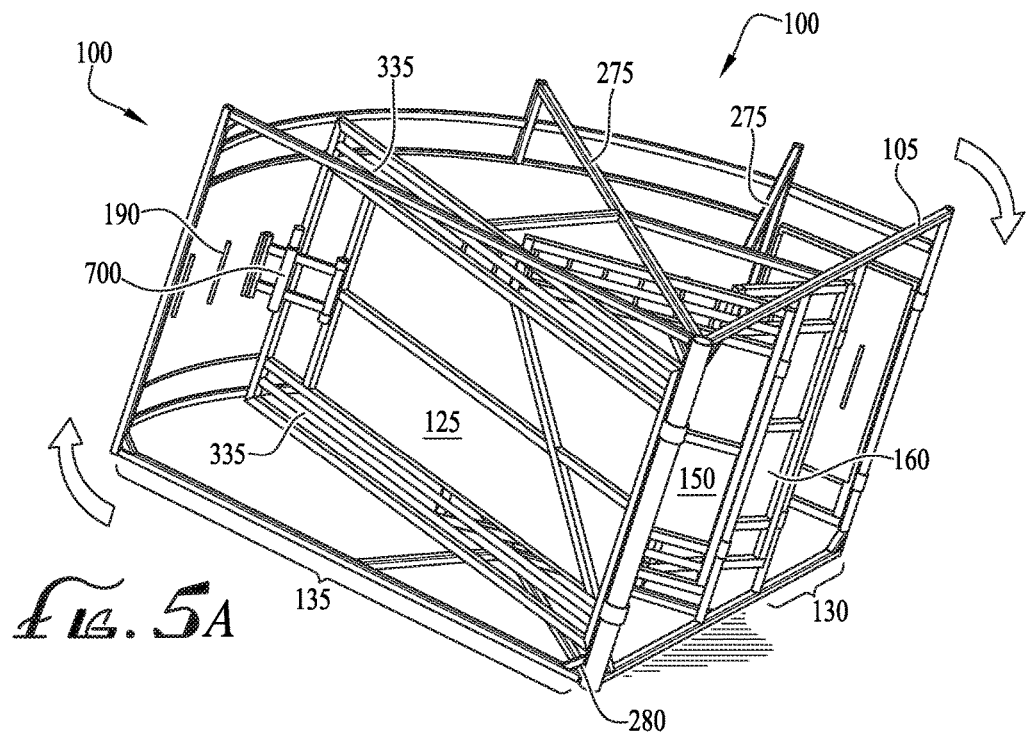
FIG. 5A is a perspective view of a crowding tub of an illustrative embodiment with gates rotatable in a clockwise direction and being inverted by rolling.
Figure 5B:
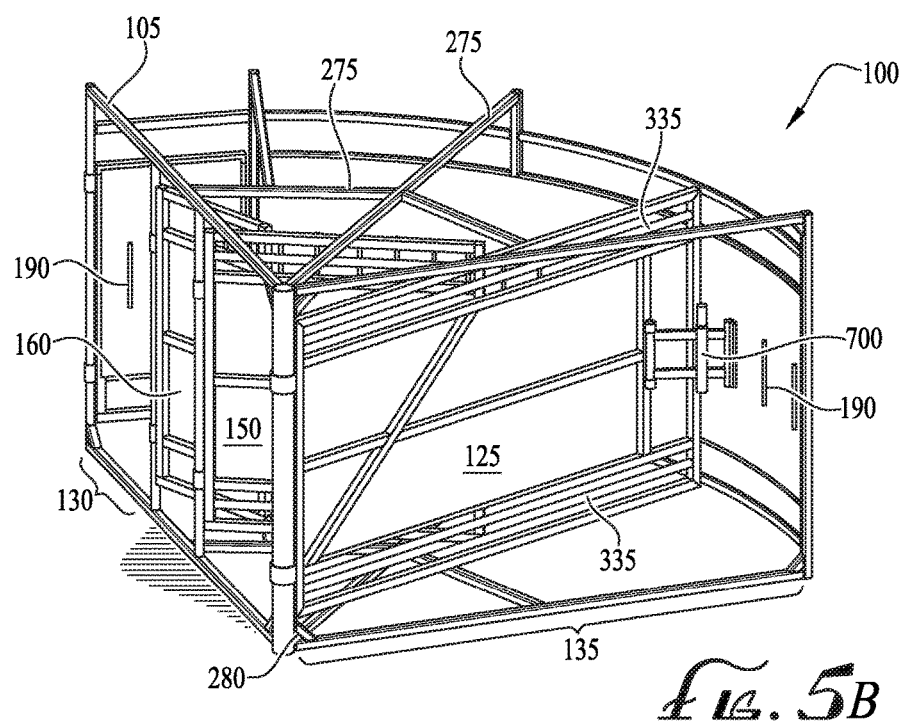
FIG. 5B is a perspective view of the crowding tub of FIG. 5A after inversion with gates rotatable in a counter-clockwise direction.

Frame 105 and gates 125, 150, 160 of crowding tub 100 may be welded together, rather than bolted. Welding may provide the advantage of being delivered to a livestock producer fully assembled and ready to use. In addition, the welding may provide additional strength and stability during the rolling process should crowding tub 100 be inverted. A livestock handler may wish to invert crowding tub 100 if he or she desires that the locations of exit side 175 and entrance side 180 be reversed and/or the direction of gate rotation to be reversed. In the embodiment illustrated in FIGS. 4A-4E, crowding tub gates pivot in a counter-clockwise direction, with animals 205 exiting at a position located counter-clockwise from animal entrance 135. As shown in FIG. 5A and FIG. 5B, crowding tub 100 may be top-to-bottom symmetric, and may be inverted by rolling should a livestock handler desire to change the direction of rotation of the gates 125, 150, 160 and/or the position of animal exit 130 of crowding tub 100. As shown in FIG. 5A, crowding tub 100 may initially be positioned such that gates 125, 150 and 160 pivot and/or rotate in a clockwise direction towards animal exit 130. Handle 700, latch 155 and/or rollers 315 may be positioned centrally along the height of gates 125, 150, 160, and stops 190 may be positioned centrally along the height of arc portion 120, such that they are at the same height, or about the same height, from the ground regardless of the "top-up" or "bottom-up" position of crowding tub 100 without adjustment. As shown in FIG. 5A and FIG. 5B, crowding tub 100 may be rolled about a horizontal axis such that the location of animal exit 130 and animal entrance 135 may be reversed. In FIG. 5B, crowding tub 100 is shown inverted from the position shown in FIG. 5A. In FIG. 5B gates 125, 150, 160 rotate in a counter-clockwise direction towards animal exit 130. Gate spring 310 and/or chain 300 may be moved in anticipation of the inversion, or gate spring 310 and/or chain 300 may be included proximate both the top and bottom of gates 125, 150, 160.

A crowding tub apparatus, system and method has been described. Illustrative embodiments provide a crowding tub with at least three gates, which gates may pivot in linked sequence to guide livestock from a herd into a single file. The crowding tub of illustrative embodiments may eliminate problematic corners that plague conventional designs, where animals conventionally become stuck. Eliminating areas where animals may become trapped, confused or caught may reduce prodding and therefore the time required to handle and/or sort livestock.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. A crowding tub comprising:
a frame forming a sector of a circle, the frame comprising two radial sides coupled together by a center post and an arc portion;
a first gate rotatably coupled to the center post, wherein the first gate extends between the center post and the arc portion, and wherein the first gate rotates around the center post between the first radial side and the second radial side of the frame;
the second radial side having an opening defining an animal exit, wherein the animal exit extends between a door post adjacent the arc portion and a gate post on the second radial side;
a second gate rotatably coupled to the second radial side between the gate post and the center post; and
a third gate rotatably coupled to the gate post;
wherein the first gate, second gate and third gate are coupled in linked sequence such that rotating the first gate around the center post towards the second radial side rotates the second and third gates into a closed position obstructing the animal exit.

2. The crowding tub of claim 1, wherein the first gate is about the length of the first radial side, the second gate is about half the length of the first gate, and the third gate is about half the length of the second gate.

3. The crowding tub of claim 1, wherein the second gate is rotatably coupled to the second radial side at about a midpoint of the second radial side.

4. The crowding tub of claim 1, wherein the first, second and third gates rotate closed in a counter-clockwise direction, and the direction of rotation reverses by rollably inverting the frame.

5. The crowding tub of claim 1, wherein the second gate is slideably coupled to the first gate and the third gate is slideably coupled to the second gate by a ringed chain, a roller, a spring or a combination thereof.

6. The crowding tub of claim 1, wherein rotating the gates towards the second radial side guides animals inside the frame out the animal exit in a single file line.

7. The crowding tub of claim 1, wherein the sector is one of a half circle, about a half circle, a quarter circle or about a quarter circle.

8. The crowding tub of claim 1, wherein the animal exit is moveable from the second radial side to the arc portion.

9. The crowding tub of claim 1, wherein the first gate comprises an extendable latch on a front side of the first gate, an inside of the arc portion comprises a set of latch stops spaced at intervals, and when in an extended position the latch engages with a particular latch stop of the set of latch stops to prevent reverse motion of the first gate.

10. A crowding tub system comprising:
a rounded frame forming a portion of a circle and three gates pivotably coupled to the rounded frame, wherein the three gates pivot in linked sequence towards an animal exit,
the three gates comprising a first gate, a second gate and a third gate, wherein the first gate is about twice the length of the second gate and the second gate is about twice the length of the third gate; and
wherein the first gate is coupled to a first post at a center point of the rounded frame, the second gate is coupled to a second post on an exit side of the rounded frame, and the third gate is coupled to a third post on the exit side of the rounded frame, wherein the second post is between the first post and the third post.

11. The crowding tub system of claim 10, wherein the second post is positioned at a midpoint of the exit side of the rounded frame.

12. The crowding tub system of claim 10, wherein the second gate is rollably coupled to the first gate and the third gate is rollably coupled to the second gate.

13. The crowding tub system of claim 10, further comprising a means for sliding the second gate along the first gate and a means for sliding the third gate along the second gate.

14. A method of funneling animals into a single file using a crowding tub, comprising:
arranging a horizontally symmetric crowding tub in a livestock handling system by rolling the crowding tub in one of a bottom-up or top-up orientation, the crowding tub comprising a series of three pivotable gates coupled in linked succession;
opening a first gate of the series of three gates outside a crowding tub frame to allow livestock to enter the crowding tub frame;

pivoting the first gate of the series of three gates inside the frame and then towards an animal exit such that the second gate and third gate successively pivot towards the animal exit; and guiding the livestock in a single file through the animal exit using the series of three pivoting gates.

15. The method of claim 14, further comprising one of rolling, sliding or a combination thereof the second gate along the first gate and one of rolling, sliding or a combination thereof the third gate along the second gate as the first gate pivots towards the animal exit.

16. The method of claim 14, wherein the livestock is cattle and the series of three gates eliminates corners inside the crowding tub where cattle become stuck.

17. The method of claim 14, further comprising extending a latch while pivoting the first gate, wherein the latch cooperates with stops on an inside of the crowding tub frame to prevent pivoting of the first gate away from the animal exit while livestock are inside the crowding tub.

\* \* \* \* \*